United States Patent
Briand et al.

(10) Patent No.: US 6,770,841 B2
(45) Date of Patent: Aug. 3, 2004

(54) USE OF HELIUM/NITROGEN GAS MIXTURES IN UP TO 8KW LASER WELDING

(75) Inventors: Francis Briand, Paris (FR); Karim Chouf, Epinay s/seine (FR); Philippe Lefebvre, Saint Ouen l'Aumône (FR); Eric Verna, Boissy l'Aillerie (FR)

(73) Assignee: L'Air Liquide, Société Anonyme à Directoire et Conseil de Surveillance pour l'Etude et l'Exploitation des Procédés Georges Claude, Paris (FR)

( * ) Notice: Subject to any disclaimer, the term of this patent is extended or adjusted under 35 U.S.C. 154(b) by 31 days.

(21) Appl. No.: 10/457,180

(22) Filed: Jun. 9, 2003

(65) Prior Publication Data

US 2003/0230556 A1 Dec. 18, 2003

(30) Foreign Application Priority Data

Jun. 14, 2002 (FR) .............................. 0207344

(51) Int. Cl.[7] .............................................. B23K 26/20
(52) U.S. Cl. .............................................. 219/121.64
(58) Field of Search ..................... 219/121.6, 121.63, 219/121.64, 121.65, 121.66, 121.84, 121.85

(56) References Cited

U.S. PATENT DOCUMENTS 4,985,604 A * 1/1991 Tyebkhan .................... 200/503
6,281,472 B1   8/2001 Faerber

FOREIGN PATENT DOCUMENTS

| DE | 199 00 477 A | 7/2000 |
|---|---|---|
| DE | 199 61 697 A | 7/2001 |
| DE | 19961697 A1 * | 7/2001 |
| EP | 1 084 788 A | 3/2001 |
| JP | 09220682 A * | 8/1997 |
| JP | 2002103072 A * | 4/2002 |
| WO | WO 02 38325 A | 5/2002 |
| WO | WO 0243918 A | 6/2002 |

OTHER PUBLICATIONS

French Search Report to FR 02 07345.

* cited by examiner

*Primary Examiner*—Samuel M. Heinrich
(74) *Attorney, Agent, or Firm*—Linda K. Russell

(57) ABSTRACT

Binary gas mixture for welding using a laser beam of up to 8 kW, consisting of 60% to 80% nitrogen by volume, the remainder (up to 100%) being helium. Application of this gas mixture to the welding of steel, stainless steel or titanium.

15 Claims, 1 Drawing Sheet

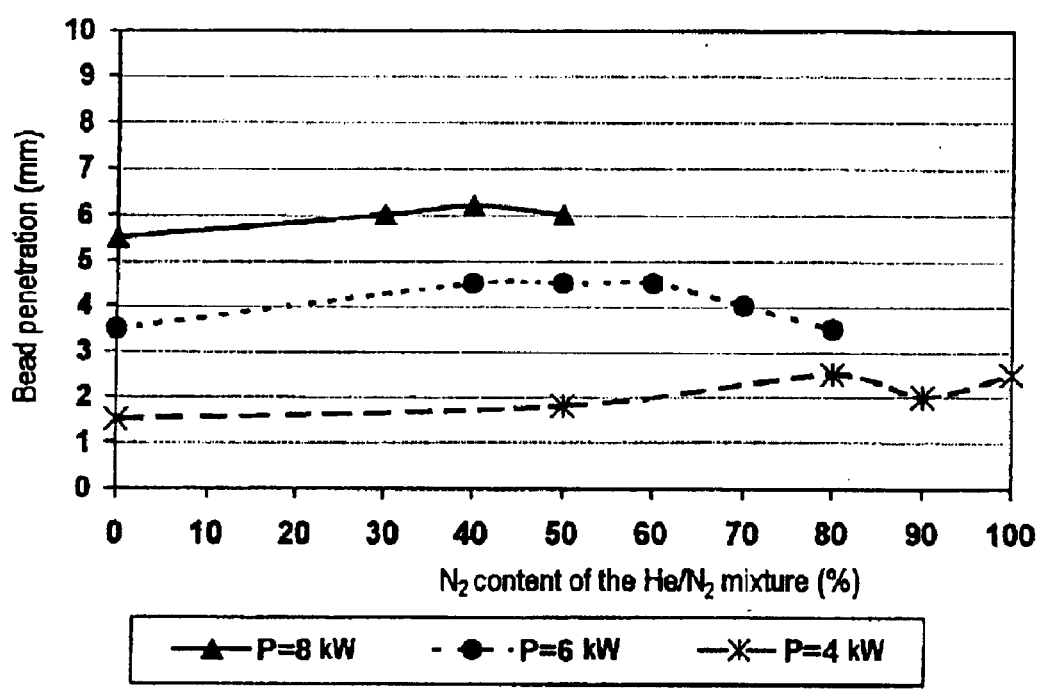
FIGURE

USE OF HELIUM/NITROGEN GAS MIXTURES IN UP TO 8KW LASER WELDING

The present invention relates to a gas mixture formed solely from helium and nitrogen and to its use in a laser welding process operating at a maximum power of 8 kW.

Laser beam welding is a very high-performance joining process as it makes it possible to obtain, at high speeds, very great penetration depths compared with other more conventional processes, such as plasma welding, MIG (Metal Inert Gas) welding or TIG (Tungsten Inert Gas) welding.

This is explained by the high power densities involved when focusing the laser beam by one or more mirrors or lenses in the joint plane of the workpieces to be welded, for example power densities that may exceed $10^6$ W/cm$^2$.

These high power densities cause considerable vaporization at the surface of the workpieces which, expanding to the outside, induces progressive cratering of the weld pool and results in the formation of a narrow and deep vapour capillary called a keyhole in the thickness of the plates, that is to say in the joint plane.

This capillary allows the energy of the laser beam to be directly deposited depthwise in the plate, as opposed to the more conventional welding processes in which the energy deposition is localized on the surface.

In this regard, the following documents may be cited: DE-A-2 713 904, DE-A-4 034 745, JP-A-01048692, JP-A-56122690, WO 97/34730, JP-A-01005692, DE-A-4 123 716, JP-A-02030389, US-A-4 871 897, JP-A-230389, JP-A-62104693, JP-A-15692, JP-A-15693, JP-A-15694, JP-A-220681, JP-A-220682, JP-A-220683, WO-A-88/01553, WO-A-98/14302, DE-A-3 619 513 and DE-A-3 934 920.

This capillary is formed from a metal vapour/metal vapour plasma mixture, the particular feature of which is that it absorbs the laser beam and therefore traps the energy within the actual capillary.

One of the problems with laser welding is the formation of a shielding gas plasma.

This is because the metal vapour plasma, by seeding the shielding gas with free electrons, may bring about the appearance of a shielding gas plasma which is prejudicial to the welding operation.

The incident laser beam may therefore be greatly disturbed by the shielding gas plasma.

The interaction of the shielding gas plasma with the laser beam may take various forms but it usually results in an effect whereby the incident laser beam is absorbed and/or diffracted and this may lead to a substantial reduction in the effective laser power density at the surface of the target, resulting in a reduction in the penetration depth, or even in a loss of coupling between the beam and the material and therefore a momentary interruption in the welding process.

The power density threshold at which the plasma appears depends on the ionization potential of the shielding gas used and is inversely proportional to the square of the wavelength of the laser beam.

Thus, it is very difficult to weld under pure argon with a $CO_2$-type laser, whereas this operation may be carried out with very much less of a problem with a YAG-type laser.

In general, in $CO_2$ laser welding, helium is used as shielding gas, this being a gas with a high ionization potential and making it possible to prevent the appearance of the shielding gas plasma, and to do so up to a laser power of at least 45 kW.

However, helium has the drawback of being an expensive gas and many laser users prefer to use other gases or gas mixtures that are less expensive than helium but which would nevertheless limit the appearance of the shielding gas plasma and therefore obtain welding results similar to those obtained with helium, but at a lower cost.

Thus, gas mixtures are commercially available that contain argon and helium, for example the gas mixture containing 30% helium by volume and the rest being argon, sold under the name LASAL™ 2045 by L'Air Liquide™, which make it possible to achieve substantially the same results as helium, for $CO_2$ laser power levels below 5 kW and provided that the power densities generated are not too high, that is to say above about 2000 kW/cm$^2$.

However, the problem that arises with this type of Ar/He mixture is that, for higher laser power densities, it is no longer suitable as the threshold at which the shielding gas plasma is created is then exceeded.

Moreover, it is also paramount for the weld penetration to be at least maintained, or even preferably increased, relative to the same laser welding process using helium.

Furthermore, yet another problem lies in the formation of NOx-type species, harmful to the welder, which must be kept as low as possible.

This is because the metal plasma temperatures, resulting from laser/material interactions as strong as those involved in laser welding, are conducive to the dissociation of nitrogen and oxygen molecules coming from air contamination and lead to the formation of harmful NOx-type species.

Consequently, to avoid or reduce the production of NOx-type species, it is essential to be able to reduce the temperature of the metal plasma resulting from laser welding.

The object of the present invention is therefore to provide a welding gas mixture based on nitrogen and a laser welding process using this gas, able to be used with a laser having a power of up to about 8 kW, which gas leads to the formation of a less hot metal plasma, with a total penetration from 5 to 10% greater than that obtained with the conventional gases used for such power levels, namely typically helium, depending on the power and the nitrogen content of the gas, and to a reduction in the formation of NOx compared with helium by itself.

The solution of the invention is therefore a binary gas mixture for welding using a laser beam consisting of 60% to 80% nitrogen by volume, the remainder (up to 100%) being helium.

Depending on the case, the gas of the invention may include one or more of the following technical features:
 it contains less than 80% nitrogen by volume;
 it contains less than 70% nitrogen by volume, preferably less than 68% nitrogen;
 it less than 67% nitrogen, preferably less than 65% nitrogen.

According to another aspect, the invention also relates to a welding process using a laser beam having a power ranging up to 8 kW, in which a gas mixture according to the invention is used for welding steel, stainless steel or titanium workpieces.

Depending on the case, the process of the invention may include one or more of the following technical features:
 the laser is of the $CO_2$ type;
 a welding operation is carried out to join two workpieces to be welded together with at least partial penetration, preferably full penetration;
 a laser having a power from 0.5 to 7 kW, preferably between 4 and 6 kW, is used;
 workpieces having a thickness ranging from 0.4 to 30 mm, preferably from 1 mm to 10 mm, are welded;

the workpieces are made of HYS (High Yield Strength) steel;

the workpieces to be welded have a zinc surface coating, particularly galvanized or electrogalvanized steel plates;

the workpieces to be welded are placed together and lap or butt welded, by backside welding or at an angle, and with or without a bevel;

the welding takes place with a single- or multiple-spot focal spot (impact);

the focal spot is circular or oblong;

the gas flow rate is between 5 l/min and 100 l/min and/or the pressure of the gas is between 1 and 5 bar; and the nozzle delivering the gas is a lateral or axial nozzle having a diameter ranging from 3 to 30 mm.

EXAMPLE

Measurement of the Penetration of Lines of Melting Produced with a $CO_2$ Laser and Shielding Gases Formed From $He/N_2$ Mixtures The curves in the appended figure show measurements of the penetration of lines of melting produced with a $CO_2$-type laser (for power levels ranging from 4 kW to 8 kW) focused on the surface of a metal target made of mild steel by a parabolic mirror possessing a focal length of 200 mm, and for variable helium and nitrogen contents of the shielding gas.

More precisely, the shielding gas was formed from $He/N_2$ mixtures having a progressively increased nitrogen content (the remainder of the mixture being only helium). For each curve, the nitrogen content of the mixture used is plotted as a percentage by volume on the x-axis.

The gas was delivered in the interaction zone by a lateral nozzle of cylindrical shape with a diameter of 12 mm, at a flow rate of 24 l/min. The welding speed was 3 m/min.

It may be seen in the curves appended hereto that the penetration of the weld beads is at least maintained for laser power levels of between 4 and 8 kW; whereas in some cases, an increase in the penetration of the beads of around 5 to 10% is even observed.

During production of these beads, it was found that a "plasma" and/or "plume" forms in the shielding gas above the interaction zone and above the metal plasma plume. The dimensions of the shielding gas plasma and/or plume depended on the nitrogen content of the mixture, on the incident laser power density, on the focal length and on the welding speed. A priori, it may have large dimensions, ranging up to several centimetres.

It seems that the formation of this plasma and/or plume in the shielding gas is associated with the presence of nitrogen molecules and/or atoms near the interaction zone. The associated consequences of the presence of this gas plasma and/or plume around the interaction zone are different from those observed in the case of He/Ar mixtures.

This is because, unlike He/Ar mixtures in which the ionization of the argon atoms during the laser welding process result in the formation of a plasma in the shielding gas which could be deleterious to the laser welding process, the gas plasma and/or plume obtained with $He/N_2$ mixtures does not impair the welding process.

In the case of $He/N_2$ mixtures, the coupling between the material and the laser beam is maintained, or sometimes even improved. Only high nitrogen contents in the $He/N_2$ mixture significantly impair the laser/material coupling.

The improvement in the penetration seems to result from the cooling of the metal plasma plume induced by dissociation of the nitrogen molecules of the mixture in contact with it.

This would therefore lead to a reduction in the size of the metal plasma plume at the surface of the plate and to a reduction in the phenomenon of absorption of the incident laser beam by the plume and an increase in the amount of laser energy available at the surface of the plate and in the capillary.

In addition, the exothermic recombination of the nitrogen atoms or ions at the surface of the walls of the capillary must also contribute to improving the process.

Furthermore, it has also been demonstrated during tests using $He/N_2$ mixtures that there is an appreciable reduction in the amount of NOx generated, depending on the nitrogen contents and laser power densities involved, compared with the amount of NOx generated with helium alone.

This is because the dissociation of nitrogen molecules, when injected into the laser/material interaction zone, absorbs some of the energy of the metal plasma and cools it.

This partly explains the reduction in the formation of NOx species around the metal plasma plume during laser welding in the laser welding process.

The content of NOx emitted during the laser welding process carried out at a speed of about 3 m/min for laser power levels of 2 kW and 8 kW was measured. The shielding gas was brought in laterally to the displacement by a nozzle 8 mm in diameter at 20 l/min. Various $He/N_2$ mixtures were used. The sampling was effected by a stainless steel probe 3 mm in diameter, which sucked up all the gases emitted by the welding process. The gases collected then passed into a standardized analyser capable of detecting the NOx-type elements and of determining their proportions. The probe was positioned 2 cm from the surface of the plate, 1.5 cm from the interaction zone, in the extension of the gas flow. The measurements carried out are given in the following table.

TABLE

| $He/N_2$ mixtures (kW)\ (ppm) | 100%/0 | | 70%/30% | | 50%/50% | | 0/100% | |
|---|---|---|---|---|---|---|---|---|
| | NO | NOx | NO | NOx | NO | NOx | NO | NOx |
| 2 kW | 13.5 | 13.5 | / | / | 2.1 | 2.4 | 1.3 | 1.4 |
| 8 kW | 70.8 | 70.8 | 40.6 | 40.6 | 33.6 | 33.5 | 2 | 2 |

It may be seen that there is an appreciable reduction in the contents of NOx emitted during the laser welding process when the nitrogen content of the $He/N_2$ shielding gas mixture increases.

What is claimed is:

1. A laser welding process, wherein at least one workpiece made of at least one material selected from steel, titanium and stainless steel, is laser beam welded using a binary gas mixture consisting of about 60% by volume to about 80% by volume of nitrogen, and the rest being helium, said laser beam having a power ranging up to 8 kW.

2. The process according to claim 1, wherein said binary gas mixture comprises less than 80% by volume of nitrogen.

3. The process according to claim 2, wherein said workpiece is made or steel or stainless steel and comprises a zinc surface coating.

4. The process according to claim 2, wherein said workpiece has a thickness from about 0.4 mm to about 30 mm.

5. The process according to claim 2, wherein said workpiece has a thickness from about 1 mm to about 10 mm.

6. The process according to claim 2, wherein said binary gas mixture comprises less than 70% by volume of nitrogen.

7. The process according to claim 2, wherein said binary gas mixture comprises less than 68% by volume of nitrogen.

8. The process according to claim 2, wherein said binary gas mixture comprises less than 67% by volume of nitrogen.

9. The process according to claim 2, wherein said binary gas mixture comprises less than 65% by volume of nitrogen.

10. The process according to claim 2, wherein said laser beam comprises a power from about 0.5 kW to about 7 kW.

11. The process according to claim 2, wherein said laser beam is of the $CO_2$ type.

12. The process according to claim 2, wherein two workpieces are joined and welded together with at least partial penetration.

13. The process according to claim 2, wherein the workpieces are joined, and welded together with at full penetration.

14. The process according to claim 2, wherein the workpieces are placed together and but or lap welded.

15. The process according to claim 14, wherein the workpieces are backside welded or welded at an angle, with or without a bevel.

* * * * *